(12) United States Patent
Florentino et al.

(10) Patent No.: US 11,687,810 B2
(45) Date of Patent: Jun. 27, 2023

(54) ACCESS CONTROL REQUEST MANAGER BASED ON LEARNING PROFILE-BASED ACCESS PATHWAYS

(71) Applicant: Carrier Corporation, Palm Beach Gardens, FL (US)

(72) Inventors: Blanca Florentino, Cork (IE); Tarik Hadzic, Cork (IE); Menouer Boubekeur, Cork (IE); Ankit Tiwari, Framingham, MA (US); John Marchioli, Fairport, NY (US); Alberto Speranzon, Maple Grove, MN (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 948 days.

(21) Appl. No.: 16/489,630

(22) PCT Filed: Feb. 27, 2018

(86) PCT No.: PCT/US2018/019950
§ 371 (c)(1),
(2) Date: Aug. 28, 2019

(87) PCT Pub. No.: WO2018/160560
PCT Pub. Date: Sep. 7, 2018

(65) Prior Publication Data
US 2020/0074338 A1 Mar. 5, 2020

Related U.S. Application Data

(60) Provisional application No. 62/465,574, filed on Mar. 1, 2017.

(51) Int. Cl.
*G06N 20/00* (2019.01)
*G06N 7/01* (2023.01)
(Continued)

(52) U.S. Cl.
CPC ............... *G06N 7/01* (2023.01); *G06N 20/00* (2019.01); *G07C 9/27* (2020.01); *G07C 9/37* (2020.01)

(58) Field of Classification Search
CPC .......... G06N 7/005; G06N 20/00; G07C 9/27; G07C 9/00103; G01C 21/206; H04L 63/20; G06F 21/604
See application file for complete search history.

(56) References Cited

U.S. PATENT DOCUMENTS

| 6,233,588 B1 | 5/2001 | Marchoili et al. |
| 6,748,343 B2 | 6/2004 | Alexander et al. |

(Continued)

FOREIGN PATENT DOCUMENTS

| CN | 203102415 U | 7/2013 |
| CN | 103839313 A | 6/2014 |

(Continued)

OTHER PUBLICATIONS

Chinese Office Action for Application No. 201880015025.5; dated Apr. 14, 2021; 12 Pages.

(Continued)

*Primary Examiner* — Vernal U Brown
(74) *Attorney, Agent, or Firm* — Cantor Colburn LLP

(57) ABSTRACT

An access control request manager based on learning profile based access pathways in a physical access control system (PACS). The access control request manager including an access pathways learning module configured to determine an reachability graph associated with each resource in the PACS, and a permissions request module, the permissions request module including an access request user interface configured to permit a user or an administrator, to provide a request for a permission to permit the user access to, or revoke the user's access to, a resource in the PACS. The (Continued)

permissions request module determines if the requested permission is already granted to the user, computes a pathway to reach the requested resource based on the reachability graph, suggests a permission, if needed, required to satisfy the request based on the computed pathway, and if approved, adds the suggested permission to any permissions granted to the user.

22 Claims, 4 Drawing Sheets

(51) Int. Cl.
*G07C 9/37* (2020.01)
*G07C 9/27* (2020.01)

(56) References Cited

U.S. PATENT DOCUMENTS

| | | | |
|---|---|---|---|
| 7,016,813 | B2 | 3/2006 | Alexander et al. |
| 7,136,711 | B1 | 11/2006 | Duncan et al. |
| 7,650,633 | B2 | 1/2010 | Whitson |
| 7,752,652 | B2 | 7/2010 | Prokupets et al. |
| 7,818,783 | B2 | 10/2010 | Davis |
| 7,944,469 | B2 | 5/2011 | Barker |
| 7,945,670 | B2 | 5/2011 | Nakamura et al. |
| 8,009,013 | B1 | 8/2011 | Hirschfeld et al. |
| 8,015,597 | B2 | 9/2011 | Libin et al. |
| 8,108,914 | B2 | 1/2012 | Hernoud et al. |
| 8,160,307 | B2 | 4/2012 | Polcha et al. |
| 8,166,532 | B2 | 4/2012 | Chowdhury et al. |
| 8,234,704 | B2 | 7/2012 | Ghai et al. |
| 8,302,157 | B2 | 10/2012 | Smith |
| 8,321,461 | B2 | 11/2012 | Hinojosa et al. |
| 8,370,911 | B1 | 2/2013 | Mallard |
| 8,464,161 | B2 | 6/2013 | Giles et al. |
| 8,533,814 | B2 | 9/2013 | Neely |
| 8,763,069 | B2 | 6/2014 | Renfro et al. |
| 8,793,790 | B2 | 7/2014 | Khurana et al. |
| 8,836,470 | B2 | 9/2014 | Pineau et al. |
| 8,907,763 | B2 | 12/2014 | Pineau et al. |
| 9,077,728 | B1 | 7/2015 | Hart et al. |
| 9,111,088 | B2 | 8/2015 | Ghai et al. |
| 9,118,656 | B2 | 8/2015 | Ting et al. |
| 9,189,623 | B1 | 11/2015 | Lin et al. |
| 9,189,635 | B2 | 11/2015 | Hori et al. |
| 9,231,962 | B1 | 1/2016 | Yen et al. |
| 9,237,139 | B2 | 1/2016 | Shaikh |
| 9,264,449 | B1 | 2/2016 | Roth et al. |
| 9,311,496 | B1 | 4/2016 | Dutch et al. |
| 9,400,881 | B2 | 7/2016 | Hernoud et al. |
| 9,418,236 | B2 | 8/2016 | Cabrera et al. |
| 9,600,340 | B1 | 3/2017 | Mundar |
| 9,923,927 | B1 | 3/2018 | McClintock et al. |
| 10,430,594 | B2 | 10/2019 | Florentino et al. |
| 2002/0026592 | A1 | 2/2002 | Gavrila et al. |
| 2002/0147801 | A1 | 10/2002 | Gullotta et al. |
| 2002/0162005 | A1 | 10/2002 | Ueda et al. |
| 2003/0126465 | A1 | 7/2003 | Tassone et al. |
| 2004/0083394 | A1 | 4/2004 | Brebner et al. |
| 2004/0153671 | A1 | 8/2004 | Schuyler |
| 2005/0099288 | A1 | 5/2005 | Spitz et al. |
| 2006/0064486 | A1 | 3/2006 | Baron et al. |
| 2007/0073519 | A1 | 3/2007 | Long |
| 2007/0272744 | A1 | 11/2007 | Bantwal et al. |
| 2008/0086758 | A1 | 4/2008 | Chowdhury et al. |
| 2008/0209506 | A1 | 8/2008 | Ghai et al. |
| 2008/0313556 | A1 | 12/2008 | Zhang et al. |
| 2010/0023249 | A1 | 1/2010 | Mays et al. |
| 2010/0241668 | A1 | 9/2010 | Susanto et al. |
| 2011/0148633 | A1* | 6/2011 | Kohlenberg ............. G07C 9/28 340/541 |
| 2011/0162058 | A1 | 6/2011 | Powell et al. |
| 2011/0221565 | A1 | 9/2011 | Ludlow et al. |
| 2011/0246527 | A1 | 10/2011 | Bitting et al. |
| 2011/0254664 | A1 | 10/2011 | Sadr et al. |
| 2012/0054826 | A1 | 3/2012 | Asim et al. |
| 2012/0084843 | A1 | 4/2012 | Hernoud et al. |
| 2012/0169457 | A1* | 7/2012 | Williamson ............. G07C 9/27 340/5.2 |
| 2012/0311696 | A1 | 12/2012 | Datsenko et al. |
| 2013/0091539 | A1 | 4/2013 | Khurana et al. |
| 2014/0033271 | A1 | 1/2014 | Barton et al. |
| 2014/0147801 | A1 | 5/2014 | Yasuda |
| 2014/0282929 | A1 | 9/2014 | Tse |
| 2015/0200925 | A1 | 7/2015 | Lagerstedt et al. |
| 2015/0220711 | A1 | 8/2015 | Lowe |
| 2015/0350902 | A1 | 12/2015 | Baxley et al. |
| 2016/0210455 | A1 | 7/2016 | Lee et al. |
| 2016/0219492 | A1 | 7/2016 | Jung |
| 2016/0308859 | A1 | 10/2016 | Barry et al. |
| 2017/0076523 | A1 | 3/2017 | Reumbre et al. |
| 2017/0098095 | A1 | 4/2017 | Gilpin |
| 2017/0236347 | A1 | 8/2017 | Drako et al. |
| 2017/0242133 | A1* | 8/2017 | Yilmaz ............... G01C 21/206 |
| 2019/0392657 | A1 | 12/2019 | Hadzic et al. |
| 2019/0392658 | A1 | 12/2019 | Hadzik et al. |
| 2020/0020182 | A1 | 1/2020 | Florentino et al. |
| 2020/0028877 | A1 | 1/2020 | Tiwari et al. |

FOREIGN PATENT DOCUMENTS

| | | |
|---|---|---|
| CN | 104040595 A | 9/2014 |
| CN | 104380351 A | 2/2015 |
| EP | 1646937 B1 | 6/2011 |
| EP | 2348438 A1 | 7/2011 |
| EP | 2732579 A1 | 5/2014 |
| EP | 2866485 A1 | 4/2015 |
| EP | 2889812 A1 | 7/2015 |
| GB | 2493078 A | 1/2013 |
| JP | 3120555 U | 4/2006 |
| JP | 2006183398 A | 7/2006 |
| WO | 0214989 A2 | 2/2002 |
| WO | 2007089503 A2 | 8/2007 |
| WO | 2012090189 A1 | 7/2012 |
| WO | 2013098910 A1 | 7/2013 |
| WO | 2015065377 A1 | 5/2015 |
| WO | 2015099607 A1 | 7/2015 |
| WO | 2016064470 A1 | 4/2016 |

OTHER PUBLICATIONS

U.S. Non-Final Office Action for U.S. Appl. No. 16/489,937; dated May 10, 2021; 16 Pages.
Assa Abloy, "Smartair Update on Card", available at: https://www.assaabloyopeningsolutions.nz/Local/NZ/Products/Access%20Control/SMARTair/Update%20on%20Card/PDF/Downloads/SMARTair%20Update%20On%20Card.pdf, accessed Aug. 27, 2019, 7 pages.
International Search Report for application PCT/US2018/019950, dated Jun. 4, 2018, 15 pages.
U.S. Non-Final Office Action for U.S. Appl. No. 16/490,295; dated Jun. 17, 2020; 28 Pages.
Axiomatics, "Attribute Based Access Control Beyond Roles", available at: https://www.axiomatics.com/blog/attribute-based-access-control-beyond-roles-1/, Aug. 2016, 4 pages.
Biuk-Aghai, Robert P. et al., "Security in Physical Environments: Algorithms and System for Automated Detection of Suspicious Activity", Department of Computerand Information Science, University of Macau, Macau, 2010, 13 pages.
Colantonio, Alessandro, "A Cost-Driven Approach to Role Engineering", In Proceedingsof the 23rd ACM Symposium on Applied Computing, SAC '08, vol. 3, 2008, pp. 2129-2136.
Colantonio, Alessandro, et al., "Mining Stable Roles in RBAC", In Proceedings of the IFIP TC 11 24th International Information Security Conference, SEC '09, 2009, pp. 259-269.
Fitzgerald, William, M., et al., "Anomaly Analysis for Physical Access Control Security Configuration", University College Cork, 2012, 8 pages.
Fong, Simon et al., "A Security Model for Detecting Suspicious Patterns in Physical Environment", Abstract, Third International Symposium on Information Assurance and Security, Aug. 2007, 1 page.

(56) References Cited

OTHER PUBLICATIONS

Gupta, Rohit, et al., "Quantitative Evaluation of Approximate Frequent Pattern Mining Algorithms", In Proceedings of the 14th ACM SIGKDD International Conference on Knowledge Discovery and Data Mining, 2008, pp. 301-309.
International Search Report and Written Opinion for application PCT/US2018/018958, dated May 18, 2018, 20 pages.
International Search Report and Written Opinion for application PCT/US2018/020216, dated May 7, 2018, 11 pages.
International Search Report and Written Opinion for application PCT/US2018/020219, dated Jun. 5, 2018, 16 pages.
International Search Report and Written Opinion for application PCT/US2018/18954, dated May 29, 2018, 14pages.
Maybury, Mark, "Detecting Malicious Insiders in Military Networks", The MITRE Corporation, 2006, 7 pages.
Metoui, N., et al., "Trust and Risk-Based Access Control for Privacy Preserving Threat Detection Systems", Abstract, International Conference on Future Data and Security Engineering, 2016, 9 pages.
West, Andrew, et al., "Mitigating Spam Using Spatio-Temporal Reputation", University of Pennsylvania, 2010, 22 pages.
Yan, Pengfan, et al., "Detection of Suspicious Patterns in Secure Physical Environments", Department of Computer and Information Science, Faculty of Science and Technology, University of Macau, Nov. 30, 2006, 6 pages.
Yen, Ting-Fang, et al., "Beehive: Large-Scale Log Analysis for Detecting Suspicious Activity in Enterprise Networks", ACSAC 2013, 10 pages.
Zhang, Dana, et al., "Efficient Graph Based Approach to Large Scale Role Engineering", Transactions on Data Privacy 7 (2014), pp. 1-26.
U.S. Final Office Action for U.S. Appl. No. 16/489,993; dated Aug. 5, 2021; 16 Pages.
U.S. Non-Final Office Action for U.S. Appl. No. 16/489,993; dated Feb. 4, 2021; 31 Pages.
U.S. Non-Final Office Action for U.S. Appl. No. 16/489,937; dated Aug. 21, 2020; 27 Pages.

* cited by examiner

ACCESS CONTROL REQUEST MANAGER BASED ON LEARNING PROFILE-BASED ACCESS PATHWAYS

TECHNICAL FIELD

The subject matter disclosed herein relates generally to physical access control systems (PACS), and more particularly an access control request manager for requesting permissions to access a resource based on learning profile-based access pathways.

BACKGROUND

Physical access control systems (PACS) prevent unauthorized individuals access to protected areas. Individuals who have a credential (e.g., card, badge, RFID card, FOB, or mobile device) present it at an access point (e.g., swipe a card at a reader) and the PACS makes an almost immediate decision whether to grant them access (e.g., unlock the door). The decision is usually computed at a controller by checking a permissions database to ascertain whether there is a static permission linked to requester's credential. If the permission(s) are correct, the PACS unlocks the door as requested providing the requestor access. Typically, with static permissions, such a request for access can be made at a given time of the day and access will be granted. In standard deployment of a PACS, a permission(s) database is maintained at a central server and relevant parts of the permissions database are downloaded to individual controllers that control the locks at the doors.

When a cardholder swipes a card at a reader, a new record is created in an access event record database, specifying the time of the day, the identity of the cardholder, the identifier of the reader and the response of the system that denies or grants access. In PACS systems static permissions include a combined reference to a physical location (a reader, a door) and time (a period of time during which the entry to a reader is permitted). One of the access control management task of (static) access permissions is to add a new permission to a cardholder that requests to access a specific room (associated with a reader) during a specific period of time (e.g. weekends). Adding only the permission that is requested can still result on the impossibility of accessing the room requested because the cardholder may need to be assigned to other permissions in order to reach the requested room. Currently, this task is performed manually by defining for each permission a list of other permissions that are required to reach it. This task consumes time and can introduce the risk of incorrect permission assignment. Moreover, defining a unique pathway could be insufficient and is risky since cardholders with different profiles (attributes) may need to use different pathways (e.g., a US person could go through an export controlled room while a non-US person should not use a pathway that includes any export control room).

BRIEF SUMMARY

According to an exemplary embodiment, described herein is an access control request manager based on learning profile based access pathways in a physical access control system (PACS). The access control request manager including an access pathways learning module configured to determine a reachability graph associated with each resource in the PACS, and a permissions request module, the permissions request module including an access request user interface configured to permit a user or an administrator, to provide a request for a permission to permit the user access to, or revoke the user's access to, a resource in the PACS. The permissions request module determines if the requested permission is already granted to the user, computes a pathway to reach the requested resource based on the reachability graph, suggests a permission, if needed, required to satisfy the request based on the computed pathway, and if approved, adds the suggested permission to any permissions granted to the user.

In addition to one or more of the features described above or below, or as an alternative, further embodiments could include that the permission request module is based on at least one of a cardholder identity CID, a resource to which access is desired, the resource associated with a reader and a door controlling access to the resource, a time zone specifying the time of the day when access to the resource is required.

In addition to one or more of the features described above or below, or as an alternative, further embodiments could include that the reachability graph is based on a statistical rule that a first reader can be reached from a second reader if there exists two consecutive access events in the history of access events for any cardholder that accesses the first reader and the second reader.

In addition to one or more of the features described above or below, or as an alternative, further embodiments could include refining the reachability graph based on an intelligent map of a facility using the PACS to form a refined reachability graph.

In addition to one or more of the features described above or below, or as an alternative, further embodiments could include computing profile based access pathways associated with the refined reachability graph and historical access event from at least one user associated with at least an attribute, wherein access pathways are a combination of pathways from a first reader to a destination reader.

In addition to one or more of the features described above or below, or as an alternative, further embodiments could include that the reachability graph is generated with a Markov model and the access pathways can be generated with a Markov model.

In addition to one or more of the features described above or below, or as an alternative, further embodiments could include the permissions request module computing at least one access pathway based on at least one attribute associated with cardholder CID to reach the requested resource based on the refined reachability graph and profile-based access pathways.

In addition to one or more of the features described above or below, or as an alternative, further embodiments could include that the permissions request module recommends a pathway among a plurality of possible pathways, and wherein the recommended pathway at least one of complies with cardholder/user profile, requires a minimum number of permissions to be added to the user, and complies with existing access control policies.

In addition to one or more of the features described above or below, or as an alternative, further embodiments could include that the recommended pathway may satisfy additional constraints based on at least one of role, minimum number of readers, minimum number of doors, and shortest distance.

In addition to one or more of the features described above or below, or as an alternative, further embodiments could include that the permission is to be assigned to, or removed from, the user based on at least one of an attribute presented by the user, a static permission assigned to other users, and a used permission of other users.

In addition to one or more of the features described above or below, or as an alternative, further embodiments could include that the suggesting a permission is based on at least one of existing access control policies for users with a selected attribute, static permissions for users with a similar attribute, and a used permission for users with a similar attribute.

In addition to one or more of the features described above or below, or as an alternative, further embodiments could include that the attribute is specific to the user.

In addition to one or more of the features described above or below, or as an alternative, further embodiments could include that the attribute is generic to a group of users.

In addition to one or more of the features described above or below, or as an alternative, further embodiments could include that the attribute is at least one of a user's role, a user's department, a badge type, a badge/card ID.

In addition to one or more of the features described above or below, or as an alternative, further embodiments could include an administrator reviewing the suggested permission.

Also described herein in an embodiment is physical access control system (PACS) with an access control request manager based on learning profile based access pathways. The physical access control system including a credential including user information stored thereon, the credential presented by a user to request access to a resource protected by a door, a reader in operative communication with the credential and configured to read user information from the credential, and a controller executing a set of access control permissions for permitting access of the user to the resource, the permissions generated with access control request manager based on learning profile based access pathways. The controller executing a method including an access pathways learning module configured to determine an reachability graph associated with each resource in the PACS, and a permissions request module in operable communication, the permissions request module including an access request user interface configured to permit a user or an administrator, to provide a request for a permission to permit the user access to, or revoke the user's access to, a resource in the PACS. The permissions request module is configured to determine if the requested permission is already granted to the user, compute a pathway to reach the requested resource based on the reachability graph, suggest a permission, if needed, required to satisfy the request based on the computed pathway, and if approved, add the suggested permission to any permissions granted to the user. The PACS also includes that the controller is disposed at the door to permit access to the resource via the door.

In addition to one or more of the features described above or below, or as an alternative, further embodiments may include that the credential is at least one of a badge, a magnetic card, an RFID card, a smart card, a FOB, and a mobile device.

Other aspects, features, and techniques of embodiments will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
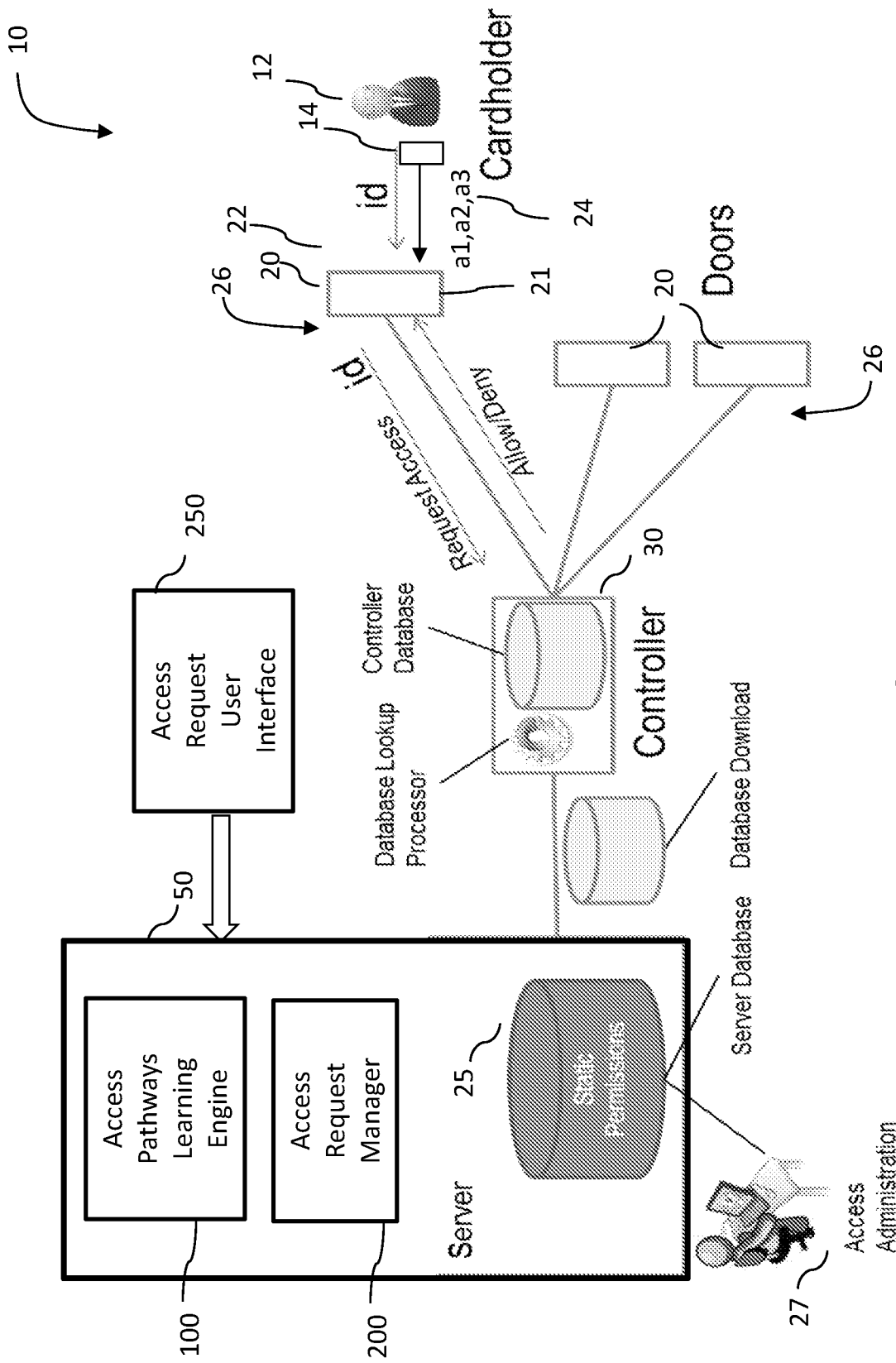
FIG. 1 depicts a standard deployment and operation of a PACS in accordance with an embodiment.

In general, embodiments herein relate to a system and methods for access request management in which: 1) a cardholder requests a permission, 2) an access request manager module suggests to an administrator the list of permissions that need to be assigned to the cardholder, and 3) administrator adds the permissions to the cardholder. In an embodiment, the access request manager module makes the suggestions for permissions by learning from historical access event database and cardholder's attributes database a pathway that cardholders with specific profiles should use to reach the different rooms in the building. Moreover, if an intelligent map of the building is available, the system may use the map to refine the proposed pathways based on the building topology.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended. The following description is merely illustrative in nature and is not intended to limit the present disclosure, its application or uses. It should be understood that throughout the drawings, corresponding reference numerals indicate like or corresponding parts and features. As used herein, the term controller refers to processing circuitry that may include an application specific integrated circuit (ASIC), an electronic circuit, an electronic processor (shared, dedicated, or group) and memory that executes one or more software or firmware programs, a combinational logic circuit, and/or other suitable interfaces and components that provide the described functionality.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection".

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in Figure X may be labeled "Xa" and a similar feature in Figure Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

FIG. 1 depicts a deployment and operation of a PACS 10. In the figure, a user 12 with a credential 14 e.g., cardholder arrives at a reader 22 at a given access point with a lock 21 e.g., locked door 20, gate etc. controlling access to a protected space also called a resource 26. The user 12 presents the credential 14 (e.g., badge, FOB, or mobile device) which is read by the reader 22 and identification information stored on the credential 14 is accessed and transmitted to a local controller 30. The controller 30 compares the identification information from the credential 14 with a permissions database 25 on the controller 30 to ascertain whether there is a permission 25 linked to user's credential 14. If the permission(s) 25 are correct, i.e., there is a match, and the particular credential 14 has authorization to access the protected space 26, the controller 30 then sends a command to the door controller or lock 21 to unlock the door 20 as requested providing the user or requestor 12 access. The controller 30 in this instance, makes an almost immediate decision whether to grant the access (e.g., unlock the door). Users 12 also expect a rapid response, waiting at the access point of access decisions would be very undesirable and wasteful. In a conventional deployment of a PACS 10, a set of static permission(s) database 25 is maintained at a central server 50. To ensure rapid response when queried, relevant parts of the permissions database 25 are downloaded to individual controllers 30 that control the locks 21 at the doors 20.

In many PACS, such as the access control system 10 shown in FIG. 1, neither the card readers 22 nor the credentials 14 e.g., access cards have any appreciable processing, power, or memory themselves. Hence, such card readers 22 and access cards 14 are usually referred to as passive devices. By contrast, the centralized controller 30 and server 50 of the access control system 10 is usually a well-designed and sophisticated device with fail-operational capabilities and advanced hardware and algorithms to perform fast decision making. Moreover, the decision making process of the centralized controller 30 is fundamentally based on performing a lookup in of the static permissions 25. The static permissions 25 may contains policy 135 (FIG. 3) based rules (e.g., one rule might provide that user 12 is not allowed entry into a given room), which change only when the policy changes (e.g., the static permissions 25 might be changed to provide that user 12 can henceforth enjoy the privileges of a given room). It should also be appreciated that the terminology "policy based rules" does not usually mean the same thing as "static permissions" and a database of static permissions 25 does not necessarily contain any policy-based rules. However, a static permission 25 does represent a very simple rule such as "user X has access to reader Y at time Z". In an embodiment, the static permissions 25 in a PACS 10 context exist as collection of "allow" permissions, stating that users 12 are allowed to access at selected readers 22. In operation, the controller 130 tries to find a permission 25 that allows access to the resource 26 and in the absence of such permission 25 it denies access. Hence there may not actually be explicit deny decisions. The overall policy 135 is "deny access unless found a static permission which allows access." Policies 135 are implemented in a set of rules that governs authorization. As an enterprise grow larger, with increasing numbers of users 12 and readers 22, the administration of the static permission 25 may become burdensome. In order to simplify administration, the permissions 25 are often organized into groups and roles which are sometimes called access levels. Administrators 27 then assign groups 16 of permissions 25 to cardholder credentials which simplifies administration. However, the number of groups grows over time and can become complex, time consuming, and error-prone to maintain. Furthermore, cardholders 12 can accumulate unused or infrequently used permissions 25, that cannot be easily removed from cardholders 12 given that their combined with other permissions 25 within access levels. The static policies 135 as mentioned above can be viewed as context-independent policies 135 and rules. In contrast, context-sensitive policies 135 will require a dynamic evaluation of different states of the PACS 10, building system parameters, other building systems, and external criteria, maybe even including the user's past history of activities. This evaluation is referred to as dynamic authorization.

With such an interconnect architecture of depicted in FIG. 1 and with a reasonable number of users 12 of a protected facility, the PACS 10 using static permissions 25 makes decisions quickly, is reliable, and is considered to be reasonably robust. However, as buildings expand and enterprises expand, the use of the static permissions 25 in a database can grow and become unwieldy. Furthermore, it is expected that buildings and facilities of the future will require increasingly more intelligent physical access control solutions. For example, access control solutions are being provided with the capability to detect such conditions as intrusion and fire. In general, this increased capability implies that such access control solutions should be provided with the ability to specify conditions that are dynamically evaluated, e.g., disable entry to a particular room 26 in case of a break-in, and/or disable entry to a particular room 26 if its occupancy reaches its capacity limit, and/or allow entry to a normal user 12 only if a supervisor is already present inside the room 26, etc. This increased capability leads to a significant emphasis on the need for a more dynamic means for requesting and assigning permissions 25 to new users 12 as well as adding new permissions 25 or modifying permissions 25 for existing users 12. Such a dynamic scheme can be centrally implemented with an architecture that learns information within PACS 10 to facilitate or automate future tasks including modifications and reconfiguration of permissions 25.

Figure 2:
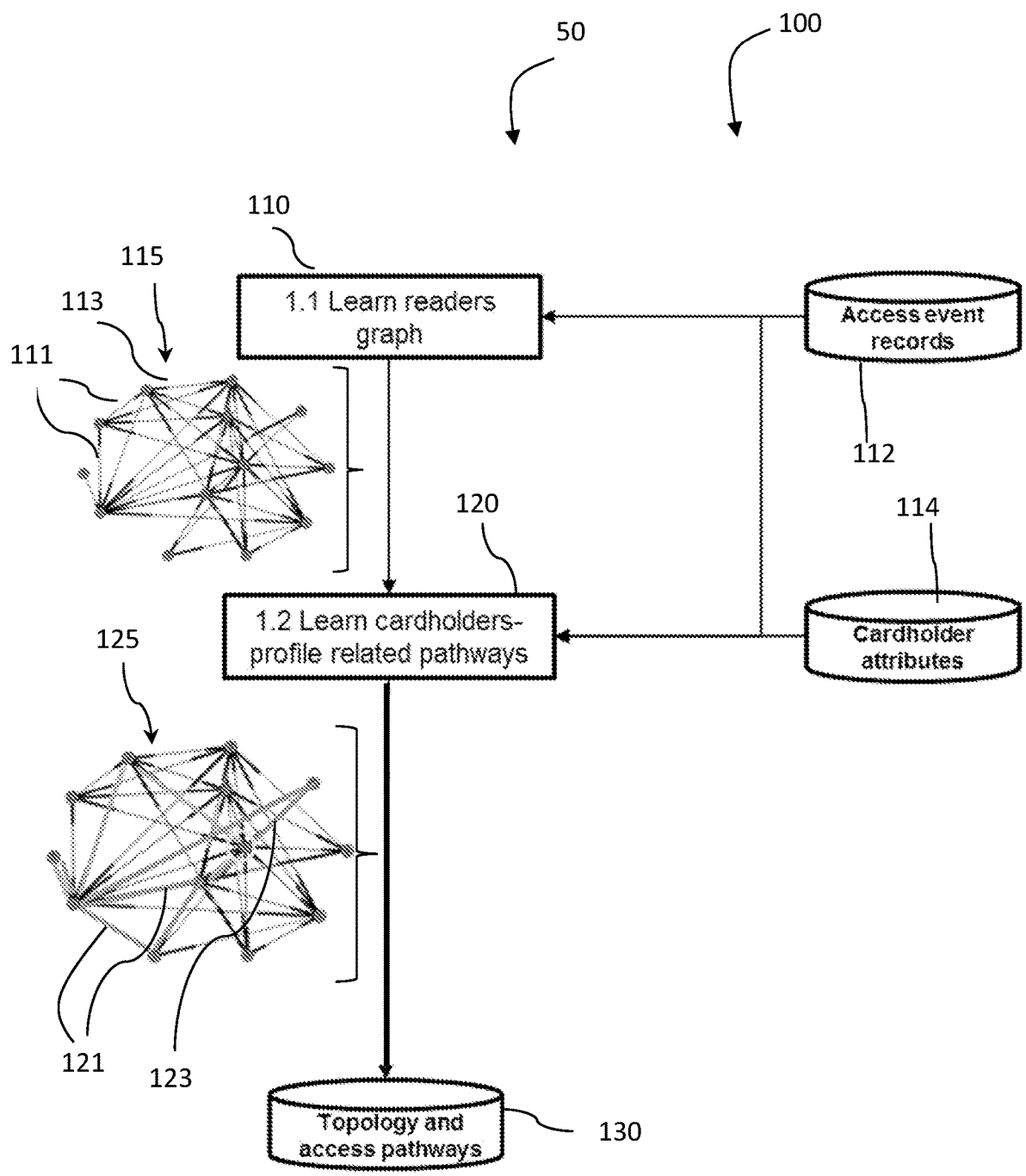
FIG. 2 depicts a flow diagram for an Access Pathways Learning Engine in accordance with an embodiment.

Turning now to FIG. 2 as well, FIG. 2 depicts a flow diagram for an Access Pathways Learning module 100. In an embodiment, the Access Pathways Learning Module (APLM) 100 is a process that can run independently of the operation of the PACS 10 and learns offline or online in background the reader's 22 (or access points/doors 20) reachability graph 115. The APLM 100 is a process operating on server 50, which may be centrally located or cloud based. The APLM 100 could also be a process operating on one or more controllers 30 in the PACS 10.

At process step 110 the reader's 22 reachability graph 115, a connectability matrix of the accessible pathways 111 between readers 22 or access points 20 in the PACS 10, is learned. A reachability graph 115 tries to capture the physical topology of the building which is analyzed to eliminate possible tailgating events. In the reachability graph 115, the edges (e.g. from a reader Rx 22 to another reader Ry 22) represent direct or simple pathways 111. That is, there is no need to traverse any other reader 22 to go from reader Rx 22 to reader Ry 22 (e.g., there is a corridor, common area, an elevator . . . between the two readers 22). More complex pathways could be a combination of simple pathways 111, i.e., a list of readers 22 that you need/can traverse to go from an initial reader 22 to a destination reader 22 in the facility.

We can define access pathways 113 as the combination of pathways 111 from any entry reader 22 (e.g. building main door) to any other reader 22 in the facility. In a simple form, the reachability graph 115 of a given facility or building is inferred based on historical event records 112 saved in the server 50 of the user's 12 accesses at all readers 22 and doors 20. In an embodiment, the reachability graph 115 is compiled employing a rule that a simple pathway 111 can be defined given reader 22 X (Rx) can be reached from and other reader 22 Y (Ry), if there exists two consecutive access events for any cardholder 12 that accesses Ry and Rx. To avoid defining wrongly a pathway between two readers based on a tailgating event, a statically analysis based on the frequency of consecutive access events is conducted, and pathways with low frequency are discarded. Of course, it will be appreciated that any variety of rules could be employed for establishing pathways 111 and the reachability graph 115, including a more conservative rule requiring more than multiple consecutive access events as a positive indication that a reader 22 can be reached from another reader 22. Moreover, if an intelligent map of the facility for the PACS 10 is available, the reachability graph 115 may be readily unnecessary or refined using topological information from the map.

Once the reachability graph 115 had been established, at process step 120 the reader reachability graph 115 and historical event records of cardholders with a specific profile (set of attributes 114) are used to compute the profile-based access pathways 121 (list of connected readers 22) that cardholders 12 with specific profile traverse from any entry reader 22 (readers giving access to facilities) to every other reader 22. The profile-based access pathways 123 are learned also from the access event database 112 with (only events from cardholders 12 with a specific profile/attributes 114) with the same rule(s) as the reachability graph 115 but considering also a sequence of events. As an example, if in the events records 112, a cardholder' access record includes the following consecutive access readers 22 "Re, R1, R3,R5, R3,R4" being Re an entry reader 22 the access pathways 123 will be {Re, R1} to R1, {Re,R1,R3} to R3, and {Re,R1, R3,R5} to R5 and {Re,R1,R3,R4} to R4. The reachability graph 115 is used to check that the direct/simple pathways 111, 121 really exist between readers 22 Re-R1, R1-R3, R3-R4 and R3-R5. When analyzing all the cardholders 12 for a specific profile, each access pathway 123 will have its corresponding frequency based on the number of time this access pathways 123 was seen in the access event database 112. Readers reachability graph and profile-based access pathways 123 as depicted at 125 are updated regularly based on new access events as the PACS 10 is used. The reachability graph and profile-based access pathways 125 is saved in the server 50 as depicted at 130 for use in managing permissions 25 requests as described herein.

Figure 3:
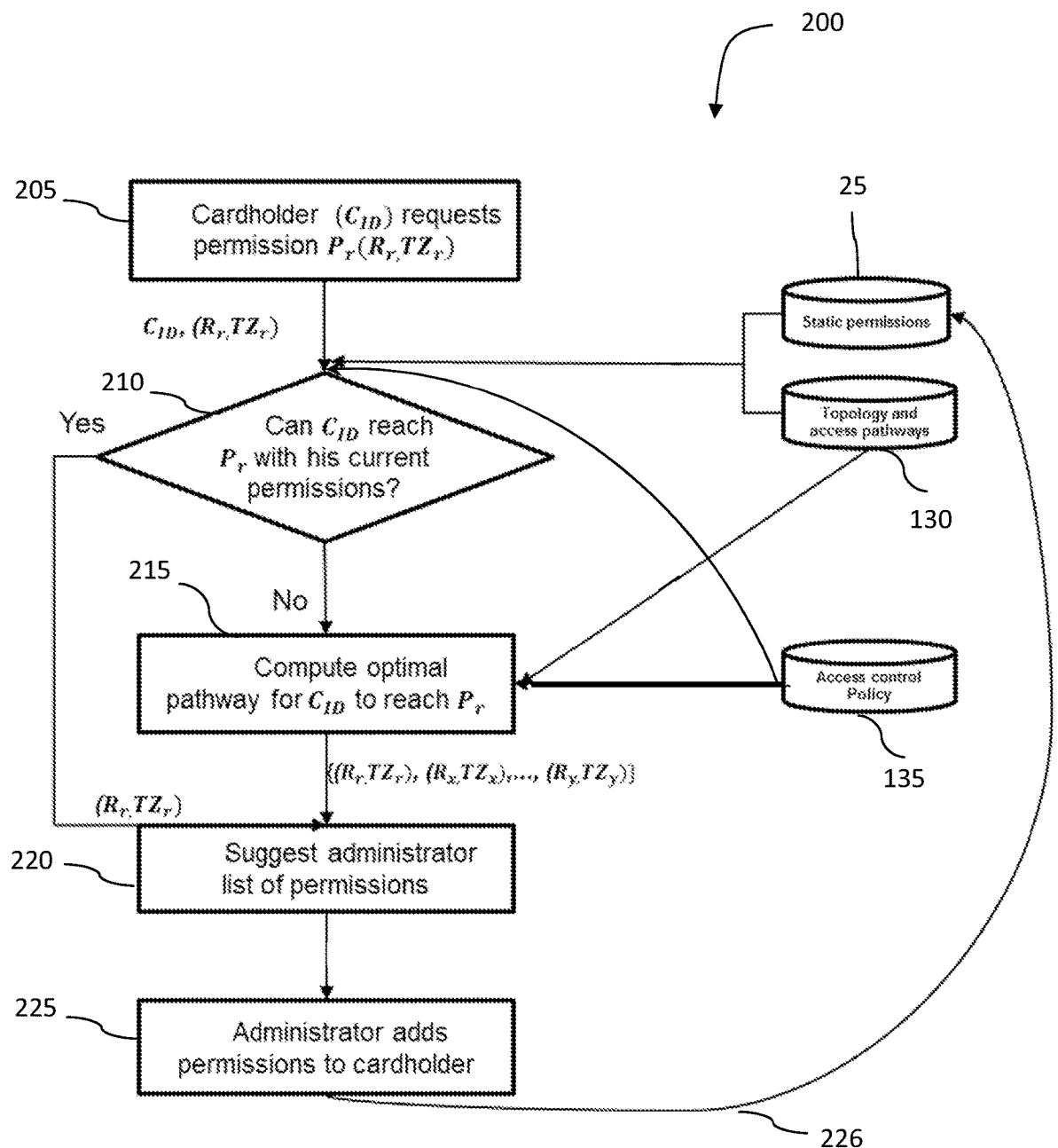
FIG. 3 depicts a flow diagram of a process for an Access Request Manager system in accordance with an embodiment.

FIG. 3 depicts a flow diagram of a process for an Access Request Manager module (ARM) 200. In an embodiment, the ARM 200 is a process that can run independently of the operation of the PACS 10 and includes an Access Request User Interface 250 to facilitate entry of a request for a new or revised permission 25. In an embodiment, the ARM system 200 facilitates addressing requests for permissions 25 to access a resource 26 in the PACS 10. The requests will be made by a user 12 needing new or additional permissions 25, but could also be made by an administrator 27, or supervisor that manages and approves access permissions 25 for a particular resource 26. The ARM 200 at process step 205 receives a request from a user 12 (or an administrator 27 or supervisor) for a permission 25 to access a room or resource 26. The request may include a Cardholder identity CID and a requested permission 25 (e.g., a room 26 associated with a reader 22 (or access point). In addition, the request may include a Time Zone that specifies the time of the day when access to the room 26 is required.

At process step 210 ARM 200 verifies if the cardholder/user 12 making the request can reach the requested resource 26 with the currently assigned set of static permissions 25 (e.g. does there exist a pathway 111 from outside all the way to the requested resource 26 and the readers 22 at that access point 20 during the requested time frame). The determination is made using the stored static permissions 25 and the reachability graph 115. If a pathway 111, 121 exists, and the requested permission 25 complies with current policies 140, the access request manager process 200 confirms to the administrator 27 that the requested permission 25 can be assigned to the cardholder 12 and the process continues at process step 220. If a pathway 111, 121 does not exist, the ARM 200 search in 130 if profile-based access pathways exists for a given CID profile and the requested permission 25. If not, it computes access pathways 123 related to that CID profile as explained in previous embodiment. In an embodiment the pathway engine identifies the possible access pathways 123, 121 in 130 that permit the user 12 to reach the resource 26 associated with the requested permission 25 based on the current cardholder 12 static permissions 25 and existing access control policies 135. In an embodiment, the engine recommends among the possible pathways 125, an optimal pathway 121. In one embodiment, the optimal pathway 121 complies with cardholder/user 12 profile, requires a minimum number of permissions 25 to be added to the cardholder 12 and complies with existing access control policies 135. In another embodiment, the optimal pathway 111, 121 may satisfy additional constraints based on role, minimum number of readers 22/doors 20 required, shortest distance, and the like.

In another embodiment, to formulate a recommendation of proposed permissions 25 when and administrator 27 is adding a new user 12 to the PACS 10, the ARM 200 uses existing access control policies 140 specifying the cardholders 12 with certain attributes 24 should have permissions 25 to resources/areas 26 with certain attributes 24 or permissions 25 to specific resources/areas 26. That is, a user 12 with certain attributes 24 may have the same permissions 25 as all other users 12 with that attribute 24. Attributes 24 can be general in nature such as a user's 12 as role, badge type etc., but can also include specifics such as badge ID or cardholder ID. The attributes 24 can be both user specific and generic in nature for an entire group of users 112. Other attributes 24 may include, but not be limited to user's department, citizenship, location, building and floor. In another embodiment, to formulate a recommendation the ARM 200 may employ static permissions 25 for cardholders 12 with similar attributes 24. These are the permissions 25 assigned to existing cardholders 12 with attributes 24 similar to the new cardholder 12. In yet another embodiment the ARM 200 may employ the actual used permissions 25 for cardholders 12 with similar attributes 24. These are the permissions 25 that historically actually been used by the existing cardholders 12 with similar attributes 24.

When new permissions 25 are added for an existing cardholder 12, in addition to using the above listed information, the ARM 200 also analyzes the static permissions 25 for other cardholders 12 that already have the requested permissions 25 to recommend additional permissions 25 that the requesting cardholder 12 might need. For example, a request for a permission 25 that may require access to an intervening door 20, would result in a suggestion of granting permission 25 for that door 20 as well. Furthermore, when revoking a given permission 25 for an existing cardholder 12, the ARM 200 also identifies and recommends other permissions 25 that should be removed by analyzing other cardholders 12 with these permissions 25, and attributes 24 of the resources or areas 26 for which permissions 25 are being revoked.

Figure 4:
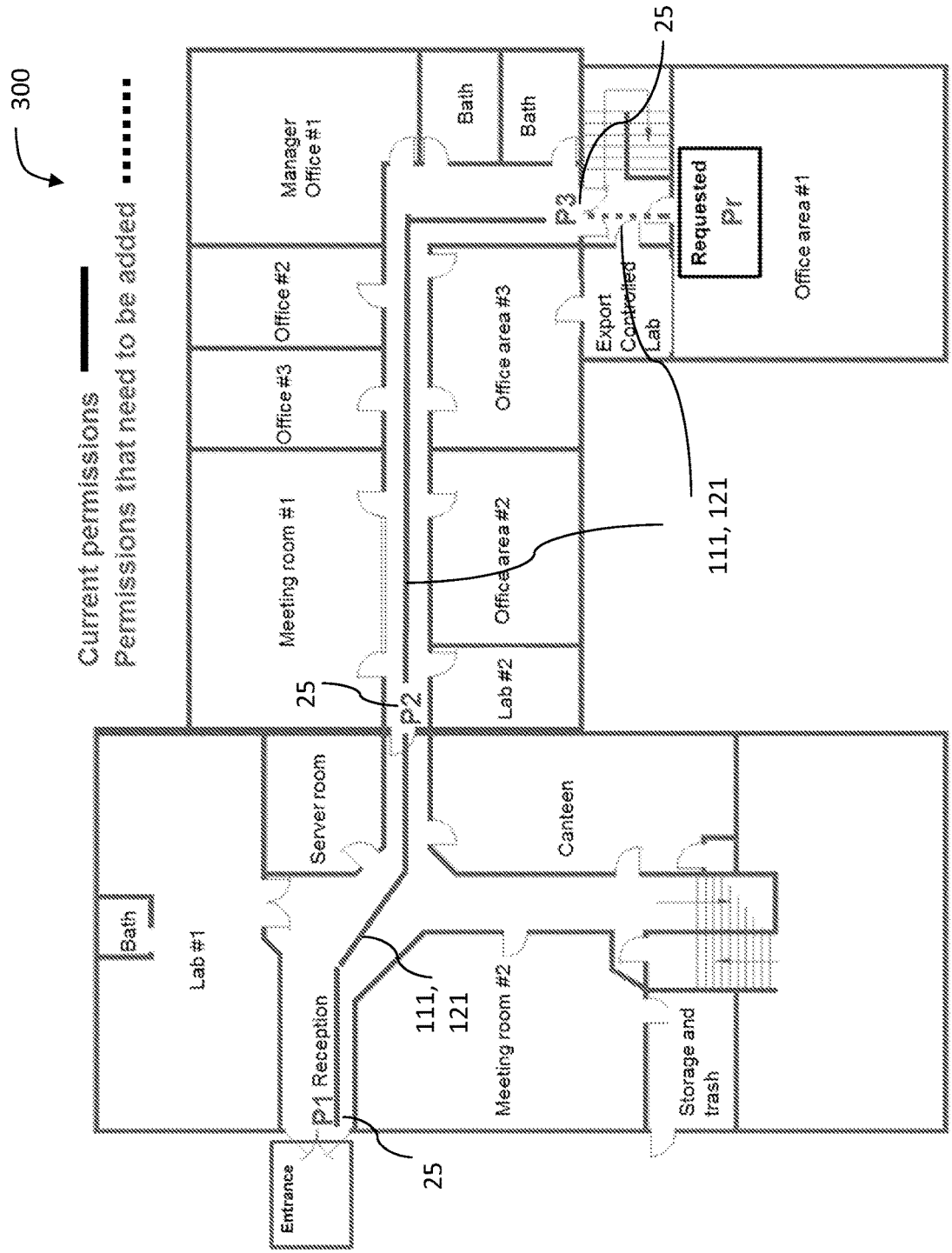
FIG. 4 depicts an example of a topological facility display identifying potential permissions to be added.

Continuing with FIG. 3 and the Access Request Manager 200, at process step 220 the process suggests a set of permissions 25 contained in the proposed pathway 111, 121. In one embodiment, the process displaying on a map or in a representation of the topology of the building with the PACS 10 the pathway highlighting the permissions 25 that need to be added for the requesting user 12. FIG. 4 depicts an example of a topological facility display 300 identifying potential permissions 25 to be added based on the pathway 111, 121 required. Returning to FIG. 3, the administrator 27 adds/modifies the suggested permissions 25 for the cardholder 12 into the static permissions 25 database on the server 50 at process step 225 as depict by line 226. The administrator 27 can also visualize on a map or in a representation of the topology of the building the pathways 111, 121 for different cardholders profiles similar to that depicted in FIG. 4 (e.g., administrator 27 selects to visualize pathways related to cardholders 12 that are non-US persons using green color versus pathways 125, 121 related to cardholders that are US persons using red color).

Continuing with FIG. 3, when the ARM 200 generates the suggestion or recommendations for permissions 25, it also indicates the rationale for recommending the permission, for e.g., by displaying the percentage of similar cardholders 12 with recommended permissions 25, percentage of cardholders 12 using the recommended permissions 25, etc. This allows an administrator 27 to make an informed decision when accepting or rejecting the recommendations. Once an administrator 27 has accepted or rejected the permissions 25 the permissions 25 are added to the database of permissions 25 on the server 50.

Note that the recommendations generated by the ARM 200 can be used to populate different user interfaces used for different entities involved in the overall permissions 25 management workflow. For example, in one instance, a cardholder 12 can self-request permissions 25 to certain resources 26 using a Cardholder Access Request user interface 250 (see FIG. 1). In such a case, in an embodiment, a subset of the permission recommendations generated by the ARM 200 for an administrator 27 can be displayed to the cardholder 12 in order to assist them in requesting the correct permissions 26. In another example, when a manager of an area or resource 26 receives an access request for approval, the subset of permission 25 recommendations that fall within the resource 26 may be identified and displayed to the manager so that they can proactively approve or add permissions 25 that may be needed by the requesting user 12.

Advantageously, the access management framework 100 described herein exhibits numerous benefits over conventional PACS 10. The described embodiments significantly reduces the time required for executing some of the most common tasks associated with administration of a PACS 10. For example, adding new cardholders 12, adding permissions 25 to existing cardholders 12, removing permissions 25 for existing cardholders 12, while preventing violations of organizational/regulatory access policies. Moreover, the described embodiments significantly reduces the facilities and organizational know-how required of administrators 27 for managing accessing permissions 25. This is a significant benefit for managed access control providers who may not be as familiar with the organization. Moreover, the described embodiments automate part of the administrative processes for an enterprise and reduces callbacks or service requests related to missing permissions 25 within an organization.

Moreover, as discussed above, system 10 may include the administrator 27. The system administrator 27 may be used to supply special system contexts or permissions 25 that are in addition to any system contexts. Such special system contexts, for example, may be used to take care of difficult situations including but not limited to revoking the access rights of a rogue user 12. Also, the system administrator 27 may be arranged to formally specify policy roles as the policies 135 relate to each user 12 and to assign the users 12 to appropriate ones of these roles.

Usually the policies 135 will not differ across every individual 12, but are likely to be different across groups of individuals 12. In this sense, a role refers to a certain policy 140 or groups of policies 135 that is applicable to a certain class of user 12. For example, a "supervisor" is a role that can include the policy 135 of free access to all rooms/resources 26, whereas a "regular employee" can be a role that includes policies 135 which allow an entry to certain protected rooms/resources 26 only if a "supervisor" is present. For example, the access control system 10 may also include user-specific authorization policies 135. An example of this can be a special user 12 who is not a regular employee at a site but needs better structured access control policies 135 as compared to a user 12 that is identified as a visitor.

The terminology used herein is for the purpose of describing particular embodiments only and is not intended to be limiting. While the description has been presented for purposes of illustration and description, it is not intended to be exhaustive or limited to the form disclosed. Many modifications, variations, alterations, substitutions, or equivalent arrangement not hereto described will be apparent to those of ordinary skill in the art without departing from the scope of the disclosure. Additionally, while the various embodiments have been described, it is to be understood that aspects may include only some of the described embodiments. Accordingly, embodiments are not to be seen as being limited by the foregoing description, but is only limited by the scope of the appended claims.

The invention claimed is:

1. An access control request manager based on learning profile based access pathways in a physical access control system (PACS), the access control request manager comprising:
   an access pathways learning module configured to determine a reachability graph associated with each resource in the PACS;
   a permissions request module in operable communication with the access pathways learning module, the permissions request module including an access request user interface configured to permit a user or an administrator, to provide a request for a permission to permit the user access to, or revoke the user's access to, a resource in the PACS, the permissions request module configured to:
   determine if the requested permission is already granted to the user;
   compute a pathway to reach the requested resource based on the reachability graph;
   suggest a permission, if needed, required to satisfy the request based on the computed pathway; and if approved, add the suggested permission to any permissions granted to the user;
wherein the reachability graph is based on a statistical rule that a first reader can be reached from a second reader if there exists two consecutive access events in a history of access events for any cardholder that accesses the first reader and the second reader.

2. The access request manager of claim 1 wherein the permission request module suggests a permission based on at least one of a cardholder identity $C_{ID}$, a resource to which access is desired, the resource associated with a reader and a door controlling access to the resource, a time zone specifying the time of the day when access to the resource is required.

3. The access request manager of claim 1 further including refining the reachability graph based on an intelligent map of a facility using the PACS to form a refined reachability graph.

4. The access request manager of claim 3 wherein the reachability graph is generated with a Markov model and the access pathways can be generated with a Markov model.

5. The access request manager of claim 3 further including the permissions request module computing at least one access pathway based on at least one attribute associated with cardholder $C_{ID}$ to reach the requested resource based on the refined reachability graph and profile-based access pathways.

6. The access request manager of claim 1 wherein the permissions request module recommends a pathway among a plurality of possible pathways, and wherein the recommended pathway at least one of complies with cardholder/user profile, requires a minimum number of permissions to be added to the user, and complies with existing access control policies.

7. The access request manager of claim 6 wherein the recommended pathway may satisfy additional constraints based on at least one of role, minimum number of readers, minimum number of doors, and shortest distance.

8. The access request manager of claim 1 wherein the permission is to be assigned to, or removed from, the user based on at least one of an attribute presented by the user, a static permission assigned to other users, and a used permission of other users.

9. The access request manager of claim 8 wherein the suggesting a permission is based on at least one of existing access control policies for users with a selected attribute, static permissions for users with a similar attribute, and a used permission for users with a similar attribute.

10. The access request manager of claim 8 wherein the attribute is specific to the user.

11. The access request manager of claim 8 wherein the attribute is generic to a group of users.

12. The access request manager of claim 8 wherein the attribute is at least one of a user's role, a user's department, a badge type, a badge/card ID.

13. The access request manager of claim 1 further including an administrator reviewing the suggested permission.

14. The physical access control system of claim 1, wherein the credential is at least one of a badge, a magnetic card, an RFID card, a smart card, a FOB, and a mobile device.

15. An access control request manager based on learning profile based access pathways in a physical access control system (PACS), the access control request manager comprising:
an access pathways learning module configured to determine a reachability graph associated with each resource in the PACS;
a permissions request module in operable communication with the access pathways learning module, the permissions request module including an access request user interface configured to permit a user or an administrator, to provide a request for a permission to permit the user access to, or revoke the user's access to, a resource in the PACS, the permissions request module configured to:
determine if the requested permission is already granted to the user;
compute a pathway to reach the requested resource based on the reachability graph;
suggest a permission, if needed, required to satisfy the request based on the computed Pathway;
if approved, add the suggested permission to any permissions granted to the user;
computing profile based access pathways associated with the refined reachability graph and historical access event from at least one user associated with at least an attribute, wherein access pathways are a combination of pathways from a first reader to a destination reader.

16. A physical access control system (PACS) with an access control request manager based on learning profile based access pathways, the physical access control system comprising:
a credential including user information stored thereon, the credential presented by a user to request access to a resource protected by a door;
a reader in operative communication with the credential and configured to read user information from the credential;
a controller executing a set of access control permissions for permitting access of the user to the resource, the permissions generated with access control request manager based on learning profile based access pathways comprising:
an access pathways learning module configured to determine an reachability graph associated with each resource in the PACS;
a permissions request module in operable communication, the permissions request module including an access request user interface configured to permit a user or an administrator, to provide a request for a permission to permit the user access to, or revoke the user's access to, a resource in the PACS, the permissions request module configured to:
determine if the requested permission is already granted to the user;
compute a pathway to reach the requested resource based on the reachability graph;
suggest a permission, if needed, required to satisfy the request based on the computed pathway; and
if approved, add the suggested permission to any permissions granted to the user;
wherein the controller is disposed at the door to permit access to the resource via the door;
wherein the reachability graph is based on a statistical rule that a first reader can be reached from a second reader if there exists two consecutive access events in a history of access events for any cardholder that accesses the first reader and the second reader.

17. The physical access control system of claim 16 wherein the permission request module suggests a permission based on at least one of a cardholder identity $C_{ID}$, a resource to which access is desired, the resource associated with a reader and a door controlling access to the resource, a time zone specifying the time of the day when access to the resource is required.

18. The physical access control system of claim 16 further including refining the reachability graph based on an intelligent map of a facility using the PACS to form a refined reachability graph.

19. The physical access control system of claim 16 wherein the permissions request module recommends a pathway among a plurality of possible pathways, and wherein the recommended pathway at least one of complies with cardholder/user profile, requires a minimum number of permissions to be added to the user, and complies with existing access control policies.

20. A physical access control system (PACS) with an access control request manager based on learning profile based access pathways, the physical access control system comprising:
a credential including user information stored thereon, the credential presented by a user to request access to a resource protected by a door;
a reader in operative communication with the credential and configured to read user information from the credential;
a controller executing a set of access control permissions for permitting access of the user to the resource, the permissions generated with access control request manager based on learning profile based access pathways comprising:
an access pathways learning module configured to determine an reachability graph associated with each resource in the PACS;
a permissions request module in operable communication, the permissions request module including an access request user interface configured to permit a user or an administrator, to provide a request for a permission to permit the user access to, or revoke the user's access to, a resource in the PACS, the permissions request module configured to:
determine if the requested permission is already granted to the user;
compute a pathway to reach the requested resource based on the reachability graph;
suggest a permission, if needed, required to satisfy the request based on the computed pathway; and
if approved, add the suggested permission to any permissions granted to the user;
wherein the controller is disposed at the door to permit access to the resource via the door;
computing profile based access pathways associated with the refined reachability graph and historical access event from at least one user associated with at least an attribute, wherein access pathways are a combination of pathways from a first reader to a destination reader.

21. The physical access control system of claim 20 further including the permissions request module computing at least one access pathways based on at the least one attribute associated with cardholder $C_{ID}$ to reach the requested resource based on the refined reachability graph and and profile-based access pathways.

22. The physical access control system of claim 21 wherein the recommended pathway may satisfy additional constraints based on at least one of role, minimum number of readers, minimum number of doors, and shortest distance.

* * * * *